July 15, 1930.  W. L. RICHARDS  1,770,626
MOTH CATCHER
Filed Aug. 18, 1928
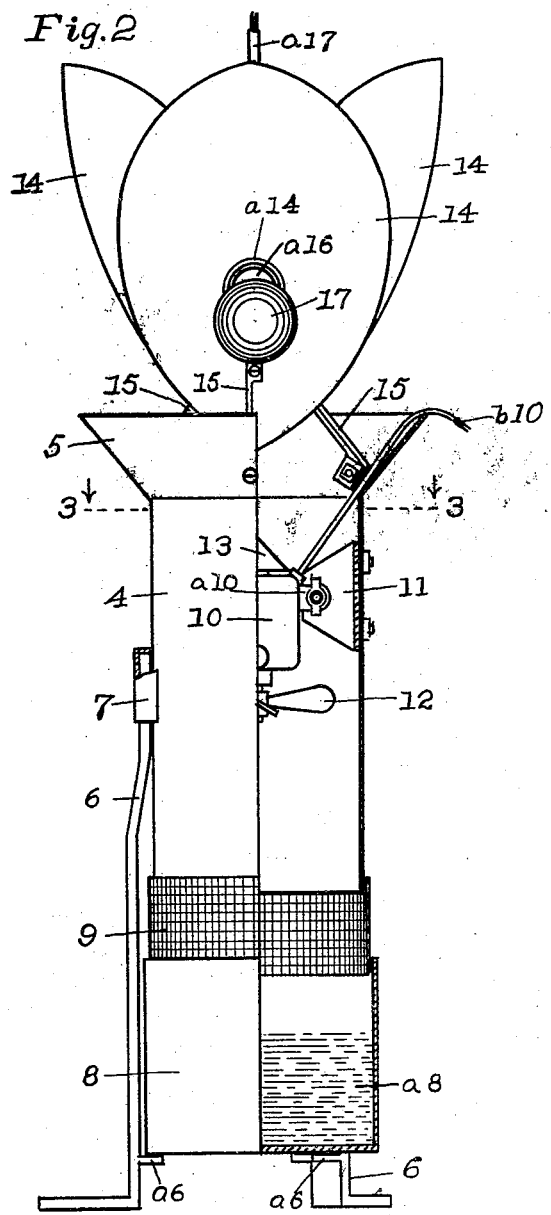
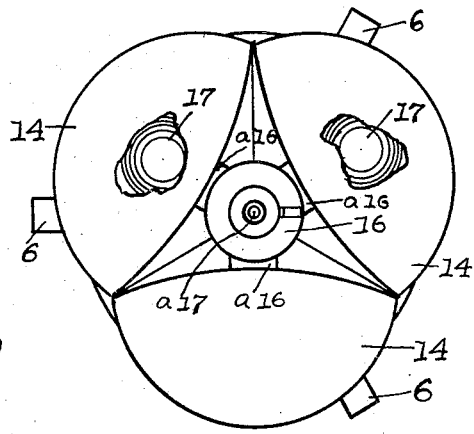
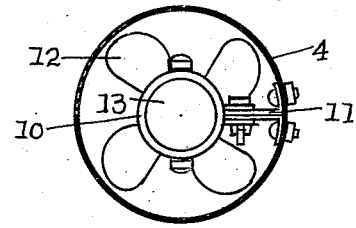
INVENTOR,
William L. Richards.
BY David E. Lain,
ATTORNEY.

Patented July 15, 1930

1,770,626

UNITED STATES PATENT OFFICE

WILLIAM L. RICHARDS, OF BELLINGHAM, WASHINGTON

MOTH CATCHER

Application filed August 18, 1928. Serial No. 300,577.

My invention relates to improvements in moth catchers and has for an object to provide a trap which will attract, retain and kill moths and similar plant enemies.

Another object of my improvement is to provide an efficient, portable, winged-insect catcher which may be used in numbers at various places about orchard and garden for continuous operation during the night to dispose of such pests and their resultant progeny in quantities. Another object of my improvement is to provide an insect catcher the illumination from which is widely projected from the open, flaring top thereof.

Other objects of my improvement will appear as the description proceeds.

I attain these and other objects of my improvement with the mechanism illustrated in the accompanying sheet of drawings forming a part of this specification in which Figure 1 is a plan view of my moth trap, Fig. 2 is a side elevation of Fig. 1 with the walls of the trap in quarter-vertical cross section and Fig. 3 is a section of the trap on the line 3—3.

Similar characters refer to similar parts throughout. Certain parts are broken away to show others hidden thereby.

With more particular reference to the designated parts: A hollow cylinder 4 has flaring top 5 and is supported in a vertical position by legs 6, 6, 6 in sockets 7 fastened to cylinder 4. Water cup 8 is retained between legs 6, on lugs $a^6$ thereon, beneath the lower open end of cylindrical body 4. Said cup is spaced apart from the body 4 which has wire screen sleeve 9 fastened to its lower end to slip into the upper part of cup 8 and fit closely therein to make a moth-tight connection therewith.

Cup 8 preferably contains a quantity of water, or other liquid, lethal to moths and similar insects.

Electric fan motor 10 is centrally mounted in body 4 near the top thereof and fastened thereto by bracket 11 which is bolted to the wall of 4 and clamped to lugs $a^{10}$ on said motor shell. The shaft of said motor coincides with the axis of body 4 and has on its lower end fan 12. Electric wires $b^{10}$ provide current connection for the motor with a source of electricity.

Conical cap 13 is preferably mounted over the top of motor 10 to prevent the lodgement of insects thereon.

When the motor 10 is in operation fan 12 draws air downward through open flaring top 5, through body 4 and projects said air into cup 8 where it is reflected from the surface of the liquid or quantity of insects therein to pass out through screen 9.

On the upper end of flaring body top 5 are mounted three concave mirrors or reflectors 14 which preferably are assembled back to back and lean outward from each other with the edges of their lower ends fastened together. This group of reflectors is retained in place by brackets 15 fastened thereto and to the top 5.

Electric lamp fixture 16 has three radial, downwardly-inclined sockets $a^{16}$ which are extended through holes $a^{14}$ in said reflectors from the rear thereof and with them are engaged incandescent electric lamps 17 which preferably are retained in the foci of said reflectors.

Electric cable $a^{17}$ connects said lamps 17 with a source of electricity, not shown.

Air drawn downward through flaring top 5 by fan 12 passes near the front surfaces of reflectors 14 as a downward current and, in operation, it is powerful enough to carry with it moths and similar insects in the vicinity thereof and project them on top of the liquid or accumulated insects in cup 8, where they may be killed by the liquid $a^8$ therein and, if not killed, they will be retained within the chamber of the body of the trap by the downward pressure of the air current as long as said fan revolves.

During the period of operation of my trap electric lamps 17 are energized and their light serves as an attraction for night-flying insects of all kinds which approach the lamps and thus come within the range of the indraught of air which overcomes their power of flight and draws them within the chamber of the trap from which they can not escape.

In practice this trap is very attractive to moths and similar insects at night and provides means of destroying them in quantities.

To remove cup 8, body 4 with its attached parts is lifted allowing legs 6 with said cup to remain on the ground for such disposal as may be desired.

Having thus disclosed my invention, what I claim as new therein and desire to secure by Letters Patent is,—

An insect trap consisting of an upright open-top vessel the upper walls of which terminate above in a plurality of inwardly and upwardly directed reflectors, electric lamps within the foci of said reflectors, an electric fan revoluble on a vertical shaft mounted for revolution within said vessel beneath said lamps, screen walls in said vessel below said fan, and a water-tight lower end in said vessel below said screen walls thereof.

WILLIAM L. RICHARDS.